United States Patent [19]

Uy et al.

[11] 4,310,477
[45] Jan. 12, 1982

[54] METHOD OF MAKING A SILICON NITRIDE PART

[75] Inventors: James C. Uy, Farmington Hills; Andre Ezis, Grosse Ile, both of Mich.

[73] Assignee: Ford Motor Company, Dearborn, Mich.

[21] Appl. No.: 781,374

[22] Filed: Mar. 25, 1977

[51] Int. Cl.$^3$ ............................................. C04B 35/58
[52] U.S. Cl. ....................................... 264/62; 264/65; 264/81; 264/86; 264/325
[58] Field of Search ................ 264/81, 86, 332, 65, 264/62, 325; 427/199, 255, 276, 331, 370

[56] References Cited

U.S. PATENT DOCUMENTS

| | | | |
|---|---|---|---|
| 3,419,935 | 1/1969 | Pfeiler | 264/332 |
| 3,455,682 | 7/1969 | Barbaras | 264/332 |
| 3,469,976 | 9/1969 | Iler et al. | 264/65 |
| 3,819,787 | 6/1974 | Coe | 264/332 |
| 3,854,189 | 12/1974 | Ezis | 264/332 |
| 3,887,411 | 7/1975 | Goodyear et al. | 264/65 |

OTHER PUBLICATIONS

Airey, *Pyrolytic Silicon Nitride Coatings*, Proc. Brit. Cer. Soc., No. 22, Jun. 1973, pp. 305–320.
Gazza, *Hot Pressed $Si_3N_4$*, J. Am. Cer. Soc., vol. 56, No. 12, p. 662.

*Primary Examiner*—John A. Parrish
*Attorney, Agent, or Firm*—William E. Johnson; Olin B. Johnson

[57] ABSTRACT

A method of making a silicon nitride part is disclosed. In this method an article of silicon nitride is first made which has a density less than the theoretical density of silicon nitride. This article also contains a densification aid. The entire surface area of this article is coated with a thin silicon nitride skin which is gas impervious. The so coated article is heated to a temperature for a time sufficient so that some of the densification aid may diffuse into the silicon nitride skin. The so treated article is then subjected to a pressure sufficiently high, for a time sufficiently long and at a temperature which permits the silicon nitride article and skin thereon to be compacted to increase the density of the article to a density greater than it originally had and to form the silicon nitride skin about the article so that the skin becomes an integral of the finished part.

10 Claims, No Drawings

METHOD OF MAKING A SILICON NITRIDE PART

This invention results from work carried out under Department of the Army Contract No. DAAG-46-71-C-0162.

BACKGROUND OF THE INVENTION

In order to increase the operating temperature and thereby the efficiency of gas turbine engines, various grades of silicon nitride are being investigated as potential materials for the hot flow path components of such engines. These various grades of silicon nitride fall into two general categories: hot pressed silicon nitride (HPSN) and reaction sintered silicon nitride (RSSN). From a property standpoint HPSN is a fully dense material and offers the highest strength whereas RSSN, being porous, has a lower strength than the HPSN. However, from the fabrication standpoint RSSN is preferred because it can be formed by injection molding techniques, slip casting techniques, and other techniques into complex shapes, while HPSN is formed by compacting the powder at high temperatures and is limited to simple shapes. Machining of HPSN to achieve a complex shape is not an attractive approach because it requires diamond grinding which is extremely costly and the shapes which can be made are still limited.

A method of combining the advantages of both classes of materials has been disclosed previously for manufacturing ceramic rotors for gas turbine engines. In this approach, a complex blade ring is made from RSSN and the hub is made from HPSN. The two parts are then diffusion bonded together in a separate operation. See U.S. Pat. No. 3,854,189. On the other hand, the HPSN may be hot pressed and simultaneously diffusion bonded to the RSSN material in a single operation. This is the preferred way of doing so and it accomplishes a bond of better quality.

This specification teaches an alternate method for achieving a high density silicon nitride article of complex shape. The method taught herein is one in which articles having complex shapes are formed originally as an RSSN material and then subsequently are subjected to pressures which densify the material to that greater than originally achieved. One may even reach a theoretical density for silicon nitride material by our process.

It is a principal object of this invention to provide a method for making complex articles of reaction sintered silicon nitride and then subsequently densifying such articles so that they have strength characteristics approaching hot pressed silicon nitride.

SUMMARY OF THE INVENTION

This invention relates to a method of making a silicon nitride part and, more particularly, to a method of making a silicon nitride part in which the strength of a reaction sintered silicon nitride article forming a portion of the part is improved by increasing its density over the density achievable in its forming operation.

In accordance with the teachings of the method of this invention, a silicon nitride part is made by first forming a silicon nitride article. The article has a density less than theoretical density. In accordance with particular teachings of this method, the article has a density in the range of from 2.0 g/cc to 2.9 g/cc. The silicon nitride article also contains a densification aid. The entire surface area of the silicon nitride article is coated with a thin silicon nitride skin which is gas impervious. In accordance with the teachings of particular embodiments of this method, the skin has a thickness in the range from 0.001 inch to 0.010 inch and a density from 3.0 g/cc to the theoretical density of silicon nitride.

The silicon nitride article with the silicon nitride skin thereon is heated to a temperature for a time period which results in the diffusion of sufficient of the densification aid contained in the article into the silicon nitride skin so that the skin may be subjected to high pressure atmosphere without cracking. In accordance with particular teachings of the method of this invention, this heating operation is carried out in a nitrogen or inert atmosphere at a temperature in the range from 1600° C. to 1800° C. for a period of 15 minutes to 12 hours.

After the diffusion of the densification aid into the silicon nitride skin, the silicon nitride article and the skin thereon are subjected to a pressure sufficiently high for a time sufficiently long that the silicon nitride article is compacted to increase the density thereof by means of the high pressure acting on the silicon nitride skin. The final density of the silicon nitride article is greater than the density originally found in the article and the silicon nitride skin becomes an integral part of the finished part. In accordance with the teachings of a detailed method of this invention, the silicon nitride article and skin thereon are subjected to a nitrogen or inert atmosphere at a pressure in the range from 1000 psi to 20,000 psi, at a temperature in a range of from 1600° C. to 1800° C. for a period of time from 5 minutes to 10 hours.

In accordance with further teachings of specific embodiments of the method of this invention, the densification aid is included as part of the original ingredients used to make the silicon nitride article. In accordance with another embodiment of this invention, the densification aid is incorporated in the silicon nitride article after that article has been formed.

In accordance with further detailed aspects of the method of this invention, the silicon nitride skin applied to the entire surface area of the silicon nitride article can be carried out by a chemical vapor deposition process. In this process, silicon and nitrogen in a vapor phase are codeposited on the silicon nitride article in proper molecular proportion to react and form a silicon nitride skin. This skin is of high density and is gas impervious. An alternate method of developing this thin skin is to slip cast silicon particles on the surface of the article. Once the slip cast particles are set, they are nitrided to form a thin skin of silicon nitride which is gas impervious.

DESCRIPTION OF THE PREFERRED EMBODIMENT

This invention is directed to the method of making a silicon nitride part. The method is initiated by making an article of silicon nitride. Such an article can be made, for example, by an injection molding technique or a slip casting technique which produces an article having a complex surface configuration. In the injection molding technique, which is well known in the art, silicon metal particles and a binder are injection molded into a mold of the shape of the article desired. The materials are subsequently removed from the mold and heated to remove the binder. The silicon particles, in the shape desired, are exposed to a nitrogen atmosphere to convert them to silicon nitride. In a slip casting operation, silicon particles supported in a suitable vehicle are slip cast into a slip casting mold. After the vehicle has been withdrawn from the mold, the silicon particles remain behind in a consolidated fashion to form the article desired. This article is removed from the mold and subjected to a nitroding operation by which the silicon particles are converted to silicon nitride.

Depending on the particular operation used to form the silicon nitride article, the article will have a density generally in the range from 2.0 g/cc to 2.9 g/cc which is not a fully dense silicon nitride article. A fully dense silicon nitride article has a density of about 3.2 g/cc.

In accordance with the teachings of this invention, it is necessary that the article of silicon nitride have a densification aid included therein. A densification aid is a material which is useful during compaction of the silicon nitride article to provide an ease in compaction in the article. Densification aids are materials such as $Ce_2O$, yttria stabilized $ZrO_2$, $Y_2O_3$, and MgO. MgO is the preferred densification aid. Normally, the densification aid is present in the article in a concentration of from $\frac{1}{2}$-10% by weight of the total article and is preferred in a range of from $\frac{1}{2}$-5%.

The densification aid may be included in the article by making it a portion of the ingredients originally used to make the article. For example, MgO may form from $\frac{1}{2}$ to 10% by weight of the total mixture used in the injection molding or the slip casting operation used to form the silicon nitride article.

On the other hand, the densification aid may be added to the silicon nitride article after it has been formed. This may be carried out by soaking the silicon nitride article in a metal salt solution such as Mg $[NO_3]_2$ [magnesium nitrate] for a period of time which allows the magnesium nitrate to soak into the silicon nitride article and deposit sufficient magnesium cations so that they are present in the amount desired. After soaking in the solution for sufficient time, the silicon nitride article is removed from the solution, dried and fired to convert the magnesium nitrate into magnesium oxide. The amount of magnesium cation deposited in the article can be measured by the change in concentration of magnesium in the solution.

Basically the first step in our method is to make an article of silicon nitride having less than theoretical density. The exact manner in which this article is prepared is not critical. The only thing critical is that the article should be less than full density and that it should also contain a densification aid therein prior to proceeding with the next step of the method of our invention. U.S. Pat. Nos. 3,887,411 and 3,887,412 disclose methods for making less than fully dense silicon nitride materials.

The next step of the method of our invention is to coat the entire surface area of the silicon nitride article with a thin silicon nitride skin which is impervious to the passage of the gas therethrough. In accordance with one embodiment of the method of our invention, the entire surface area of the silicon nitride article is coated with a silicon nitride skin having a thickness in the range from 0.001 inch to 0.010 inch. This thin skin has a density from about 3.0 g/cc to the theoretical density of silicon nitride. The thin skin may be laid down on the article in any manner which produces such a thin dense skin which is gas impervious. Two ways of preparing such a skin will be illustrated below.

One way of placing thin skin on the article is to slip cast silicon particles against the article of silicon nitride. Since the article of silicon nitride is not fully dense, it has some porosity and can act as a device for drawing the vehicle out of a casting slip. The slip casting process produces a thin layer of silicon particles on the silicon nitride article. This thin skin of silicon particles is converted to silicon nitride in a nitriding operation in which nitrogen gas is reacted with the silicon metal particles. Full details of how to obtain such a skin of thin silicon nitride are set forth in copending U.S. patent application Ser. No. 415,898 entitled "Process For Making a Silicon Nitride Article", which application is hereby incorporated by reference. This application is assigned to the same assignee as this application.

Another way of making a thin impervious coating of silicon nitride on the silicon nitride article is by a chemical vapor deposition technique. In this technique, a silane and nitrogen are reacted from a vapor phase on the surface of the silicon nitride article to form a very thin and dense silicon nitride coating on all areas of the article. This process may be carried out using materials such as $SiCl_4$ and $NH_3$, at a temperature of 1100° to 1380° C. and carried out in a vacuum. Such a chemical vapor deposition technique is well known in the art.

Thus, the second step in the process of our invention to produce a silicon nitride part is one in which the entire surface area of the silicon nitride article is coated with a thin silicon nitride skin which is gas impervious. The purpose of this coating is to provide a device through which pressure can be applied to the less than fully dense silicon nitride article contained therewithin to bring about a further compaction and densification thereof. In order to bring about such a compaction, however, it is necessary to carry out a processing step as will be described below.

Prior to compacting the less than fully dense silicon nitride article, the silicon nitride article with its thin silicon nitride skin thereon is heated to a temperature for a time period which results in the diffusion of sufficient densification aid contained in the article into the silicon nitride skin. The diffusion of the densification aid must take place so that the thin silicon nitride skin may be subjected to a high pressure atmosphere without cracking. If no densification aid is diffused into the thin skin, subsequent application of pressure to this skin will cause it to rupture and crack.

The diffusion of the densification aid into the silicon nitride skin can be brought about by heating the silicon nitride article with its skin thereon to a temperature in the range of from 1600° C. to 1800° C. for a period of from 15 minutes to 12 hours. The treatment temperature and time are selected so that the skin will have about 0.1 to 10 parts per hundred of a densification aid therein at the end of treatment. One may determine the particular temperature and time required to get this amount of densification aid into the thin skin once one knows the thickness of the skin and the rate of migration of the densification aid. We preferably carry out this operation for a time period of one to two hours at a temperature of 1750° C. This heating operation may be carried out in a nitrogen or an inert atmosphere at any pressure desired.

After the article has been heated so that a diffusion of the densification aid takes place into the silicon nitride skin, the silicon nitride article and the silicon nitride skin thereon are subjected to a pressure sufficiently high for a time sufficiently long that the pressure acts through the silicon nitride skin to compact the silicon nitride article to increase its density to a density greater than its original density. This pressure operation also forms this skin into a unit which is tightly adherent to the compacted silicon nitride article whereby the silicon nitride skin becomes a part of the finished part.

In accordance with particular teachings of this invention, the compacting operation is carried out by subjecting the silicon nitride article and skin thereon to a nitrogen or inert atmosphere at a pressure in a range from 1000 psi to 20,000 psi, preferably 5,000 psi, at a temperature in a range from 1600° C. to 1800° C., preferably 1750° C., for a period of time from 5 minutes to 10 hours. The particular pressure and temperature depend on the configuration of the article. Other factors controlling time and temperature are the original density of the silicon nitride article and the particular density desired in the final part. As a greater final density is required, it is suggested that higher pressures, temperatures and treatment times be used. Generally, to achieve the benefits of this invention, one would compact the silicon nitride article to a point where it had a final density in the range from 3.0 g/cc to theoretical density.

After this compacting operation, the skin becomes an integral part of the silicon nitride article and the finished part is a composite of the two elements. The finished part has an extremely high density. The article also can have a complex shape which is the real benefit of the method of this invention. By our method, articles of complex shape can be manufactured without resort to hot pressing techniques.

There has been disclosed herein a method of making silicon nitride articles of complex shape of near theoretical density. In view of the specification, those skilled in the art will be able to develop obvious modifications of this method. It is intended that all methods which fall within the true spirit and scope of this invention be included within the appended claims.

What we claim is:

1. A method of making a silicon nitride part which comprises the steps of:
    making an article of silicon nitride, said article having a density less than the theoretical density of silicon nitride, said silicon nitride article also containing a densification aid therein;
    coating the entire surface area of said silicon nitride article with a silicon nitride skin which is impervious to the passage of a gas therethrough;
    heating said silicon nitride article with said silicon nitride skin thereon to a temperature for a time sufficient to result in the diffusion of sufficient of said densification aid contained in said silicon nitride article into said silicon nitride skin so that said silicon nitride skin may be subjected to high pressures without cracking;
    subjecting said silicon nitride article and said silicon nitride skin thereon to an inert, gaseous atmosphere at a pressure sufficiently high for a time sufficiently long that said silicon nitride article is compacted to increase the density thereof to a density greater than said silicon nitride article originally had, and whereby said silicon nitride skin is pressed into engagement with the compacted silicon nitride article to become an integral portion of the finished part.

2. The method of claim 1 wherein: said densification aid is included as part of the ingredients to make said silicon nitride article.

3. The method of claim 1 wherein: said densification aid is incorporated in said silicon nitride article after said article has been formed.

4. The method of claim 1 wherein: said silicon nitride article is coated in a chemical vapor deposition operation to develop said silicon nitride skin thereon.

5. The method of claim 1 wherein: said silicon nitride article has a silicon nitride skin developed thereon by a process in which a silicon metal slip is cast against said silicon nitride article to provide a thin layer of silicon particles on said article and wherein said thin skin of silicon particles are nitrided to produce a gas impervious silicon nitride skin on said silicon nitride article.

6. A method of making a silicon nitride article which comprises the steps of:
    making an article of silicon nitride, said article having a density in the range from 2.0 g/cc or to 2.9 g/cc, said silicon nitride article also having a densification aid incorporated therein;
    coating the entire surface area of said silicon nitride article with a silicon nitride skin which is impervious to the passage of a gas therethrough, said skin having a thickness in the range from 0.001 inch to 0.010 inch and a density from 3.0 g/cc to the theoretical density of silicon nitride;
    heating said silicon nitride article with said silicon nitride skin thereon to a temperature in the range from 1600° C. to 1800° C. for a period of 15 minutes to 12 hours to diffuse sufficient of said densification aid contained in said silicon nitride article into said silicon nitride skin so that said silicon nitride skin may be subjected to high pressures without cracking, said heating operation being carried out in a nitrogen or inert atmosphere;
    subjecting said silicon nitride article and skin thereon to a nitrogen or inert atmosphere at a pressure in a range from 1,000 psi to 20,000 psi, at a temperature in a range from 1600° C. to 1800° C., for a period of time from 5 minutes to 10 hours whereby said silicon nitride article and silicon nitride skin thereon are compacted to the point where said silicon nitride article has a density in the range from 3.0 g/cc to theoretical density for silicon nitride, and whereby said silicon nitride skin becomes an integral portion of the finished part.

7. The method of claim 6 wherein: said densification aid is included as part of the ingredients to make said silicon nitride article.

8. The method of claim 6 wherein: said densification aid is incorporated in said silicon nitride article after said article has been formed.

9. The method of claim 6 wherein: said silicon nitride article is coated in a chemical vapor deposition operation to develop said silicon nitride skin thereon.

10. The method of claim 6 wherein: said said silicon nitride article has a silicon nitride skin developed thereon by a process in which a silicon metal slip is cast against said silicon nitride article to provide a thin layer of silicon particles on said article and wherein said thin skin of silicon particles are subsequently nitrided to produce a gas impervious silicon nitride skin on said silicon nitride article.

* * * * *